United States Patent
Subrahmanyam et al.

(10) Patent No.: US 10,755,267 B2
(45) Date of Patent: Aug. 25, 2020

(54) SYSTEMS AND METHODS FOR A MERCHANT-SPECIFIC PAYMENT TOKEN

(71) Applicant: American Express Travel Related Services Company, Inc., New York, NY (US)

(72) Inventors: Vishnuvajhala V. Subrahmanyam, Phoenix, AZ (US); Andras L. Ferenczi, Peoria, AZ (US); Yuval Refua, New York, NY (US); Sathish B. Muthukrishnan, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 913 days.

(21) Appl. No.: 15/177,222

(22) Filed: Jun. 8, 2016

(65) Prior Publication Data
US 2017/0357964 A1 Dec. 14, 2017

(51) Int. Cl.
*G06Q 20/40* (2012.01)
*G06Q 20/36* (2012.01)
*G06Q 20/02* (2012.01)

(52) U.S. Cl.
CPC ......... *G06Q 20/3674* (2013.01); *G06Q 20/02* (2013.01); *G06Q 20/40* (2013.01); *G06Q 20/4014* (2013.01)

(58) Field of Classification Search
CPC .... G06Q 20/3674; G06Q 20/02; G06Q 20/40; G06Q 20/4014
USPC .......................................................... 705/67
See application file for complete search history.

(56) References Cited

U.S. PATENT DOCUMENTS

| | | | |
|---|---|---|---|
| 2013/0013512 A1 | 1/2013 | Cloud | |
| 2014/0164243 A1* | 6/2014 | Aabye ................ | G06Q 20/3821 705/44 |
| 2014/0037230 A1 | 12/2014 | Sheets | |
| 2014/0372308 A1* | 12/2014 | Sheets .................... | G06Q 20/32 705/44 |
| 2015/0032626 A1* | 1/2015 | Dill ........................ | G06Q 20/40 705/44 |

(Continued)

FOREIGN PATENT DOCUMENTS

WO 2014081523 5/2014

OTHER PUBLICATIONS

Crowe et al., "Is Payment Tokenization Ready for Primetime? Perspectives from Industry Stakeholders on the Tokenization Landscape", Federal Reserve Bank of Atlanta and Federal Reserve Bank of Boston, Jun. 11, 2015, 51 pages (Year: 2015).*

(Continued)

*Primary Examiner* — James D Nigh
(74) *Attorney, Agent, or Firm* — Thomas | Horstemeyer, LLP

(57) ABSTRACT

The systems may include receiving a token request for a transaction from a merchant, the token request comprising a consumer identifier associated with a consumer and a merchant identifier (MID) associated with the merchant, matching the MID with a token requestor identifier (TRID) assigned to the merchant, matching the consumer identifier with an account identifier associated with a transaction account of the consumer, generating a digital token comprising the TRID and the account identifier, and transmitting the digital token to the merchant.

20 Claims, 7 Drawing Sheets

(56) References Cited

U.S. PATENT DOCUMENTS

| | | | |
|---|---|---|---|
| 2015/0127547 A1* | 5/2015 | Powell | G06Q 20/385 |
| | | | 705/67 |
| 2015/0199689 A1* | 7/2015 | Kumnick | G06Q 20/4016 |
| | | | 705/67 |
| 2016/0098708 A1 | 4/2016 | Loomis | |
| 2016/0328707 A1* | 11/2016 | Wagner | G06Q 20/38215 |
| 2017/0255932 A1* | 9/2017 | Aabye | H04L 63/06 |

OTHER PUBLICATIONS

Allen et al., "The Evolution of Payment Specifications and Tokenization", Smart Card Alliance and EMVCo Webinar, Nov. 4, 2015, 40 pages (Year: 2015).*
EMV® Payment Tokenisation Specification, Technical Framework, Version 1.0, Mar. 2014, 84 pages, EMVCo, LLC("EMVCo") (Year: 2014).*
Examination Report dated Aug. 7, 2018 in European Serial No. 17174839.5.
EP Search report dated Sep. 14, 2017 in EP Application No. 17174839.5.

* cited by examiner

_US 10,755,267 B2_

SYSTEMS AND METHODS FOR A MERCHANT-SPECIFIC PAYMENT TOKEN

FIELD

The present disclosure generally relates to systems and methods for payment tokens, and more specifically, payment tokens that are merchant-specific.

BACKGROUND

Issuers and/or administrators of a transaction account, or token service providers, may issue digital tokens linked to specific transaction accounts configured to facilitate transactions. A digital token may allow the issuer and/or administrator a virtual payment mechanism for paying for the transaction using the transaction account. The digital token may comprise transaction account information for the transaction account being used for payment. Therefore, the surreptitious interception of digital payment tokens may expose the owners of transaction accounts to fraudulent charges.

SUMMARY

A system, method, and article of manufacture (collectively, "the system") are disclosed relating to a merchant-specific payment token. In various embodiments, the system may be configured to perform operations including receiving a token request for a transaction from a merchant, the token request comprising a consumer identifier associated with a consumer and a merchant identifier (MID) associated with the merchant; matching the MID with a token requestor identifier (TRID) assigned to the merchant; matching the consumer identifier with an account identifier associated with a transaction account of the consumer; generating a digital token comprising the TRID and the account identifier; and transmitting the digital token to the merchant.

In various embodiments, the TRID and the account identifier may be comprised in a transaction pair identifier, wherein the transaction pair identifier may be associated with the merchant and with the transaction account of the consumer. The matching the MID with the TRID may comprise matching the MID with the transaction pair identifier, and the matching the consumer identifier with the account identifier may comprise matching the consumer identifier with the transaction pair identifier.

In various embodiments, the operations may further comprise generating the TRID for the merchant prior to the receiving the token request and/or associating the TRID to the MID in response to the assigning the TRID. In various embodiments, the operations may further comprise receiving an authorization request comprising the digital token and the MID, the digital token comprising the TRID and the account identifier, wherein the TRID and the MID may be a TRID and MID combination. In various embodiments, the operations may further comprise comparing the TRID and MID combination in the authorization request to a stored TRID and MID combination. In various embodiments, the operations may further comprise transmitting an authorization response to the merchant, wherein the authorization response at least one of rejects the transaction in response to the TRID and MID combination differing from the stored TRID and MID combination, or approves the transaction in response to the TRID and MID combination matching the stored TRID and MID combination.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
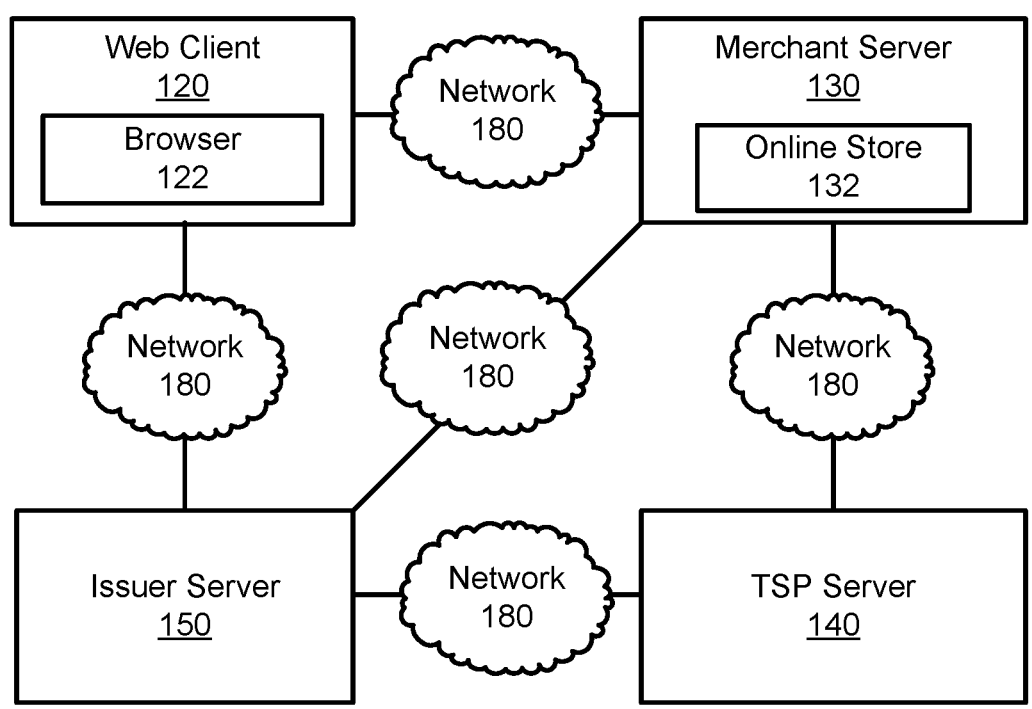
FIG. 1 depicts an exemplary payment system for implementing a merchant-specific payment token, in accordance with various embodiments.

In various embodiments, and with reference to FIG. 1, an exemplary payment system for implementing a merchant-specific payment token is disclosed. In various embodiments, system 100 may comprise a web client 120, a merchant server 130, a token service provider ("TSP") server 140, and/or an issuer server 150. All or any subset of components of system 100 may be in communication with one another via a network 180. System 100 may be computer based, and may comprise a processor, a tangible non-transitory computer-readable memory, and/or a network interface. Instructions stored on the tangible non-transitory memory may allow system 100 to perform various functions, as described herein.

In various embodiments, web client 120 may incorporate hardware and/or software components. For example, web client 120 may comprise a server appliance running a suitable server operating system (e.g., MICROSOFT INTERNET INFORMATION SERVICES or, "IIS"). Web client 120 may be any device that allows a user to communicate with network 180 (e.g., a personal computer, personal digital assistant (e.g., IPHONE®, BLACKBERRY®), cellular phone, kiosk, and/or the like). Web client 120 may be in communication with merchant server 130 and/or issuer server 150 via network 180. Web client 120 may participate in any or all of the functions performed by merchant server 130 via network 180.

Web client 120 includes any device (e.g., personal computer) which communicates via any network, for example such as those discussed herein. In various embodiments, web client 120 may comprise and/or run a browser 122, such as MICROSOFT® INTERNET EXPLORER®, MOZILLA® FIREFOX®, GOOGLE® CHROME®, APPLE® Safari, or any other of the myriad software packages available for browsing the internet. For example, browser 122 may communicate with merchant server 130 via network 180 by using Internet browsing software installed in browser 122. Browser 122 may comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. In various embodiments, browser 122 may be configured to display an electronic channel.

In various embodiments, merchant server 130 may be associated with a merchant, and may incorporate hardware and/or software components. For example, merchant server 130 may comprise a server appliance running a suitable server operating system (e.g., Microsoft Internet Information Services or, "IIS"). Merchant server 130 may be in communication with web client 120, TSP server 140 and/or issuer server 150. In various embodiments, merchant server 130 may comprise a merchant identifier (MID) which is specific to the merchant. The MID may be a number, or any other suitable identifier, specific to the merchant that identifies the merchant in a transaction. In various embodiments, merchant server 130 may comprise an online store 132, which consumers may access through browser 122 to purchase goods or services from the merchant.

In various embodiments, in response to merchant server 130 receiving a purchase order from a consumer via web client 120 during a transaction, merchant server 130 may transmit a token request to TSP server 140 for TSP server 140 to generate and provide a digital token to serve as a virtual payment mechanism to complete the transaction. The token request may comprise the MID associated with the merchant, and a consumer identifier. The consumer identifier may be a number, or any other suitable identifier, associated with a consumer profile specific to the consumer. The consumer profile may be associated with the consumer's transaction account, transaction account information, etc. The consumer may conduct transactions in-person, or electronically by logging into the consumer profile, thereby authenticating the consumer through the login process.

In various embodiments, TSP server 140 may be associated with a TSP, and may comprise hardware and/or software capable of storing data and/or analyzing information. TSP server 140 may comprise a server appliance running a suitable server operating system (e.g., MICROSOFT INTERNET INFORMATION SERVICES or, "IIS") and having database software (e.g., ORACLE) installed thereon. TSP server 140 may be in electronic communication with web client 120, merchant server 130, and/or issuer server 150. In various embodiments, TSP server 140 may comprise software and hardware capable of accepting, generating, receiving, processing, and/or analyzing information related to completing transactions, including electronic transactions, such as TRIDs, MIDs, account identifiers, transaction pair identifiers (discussed herein), etc. For example, TSP server 140 may be capable of accepting, receiving, processing, and/or analyzing transaction account information associated with consumers and their transaction accounts, such as consumer identifiers, account identifiers, account numbers, transaction accounts etc., and merchant information associate with merchants such as a MIDs, token requestor identifiers (TRIDs), etc.

In various embodiments, TSP server 140 may receive and store a MID associated with a merchant from merchant server 130. TSP server 140 may generate and assign a TRID that is specific to the merchant. TSP server 140 may store the TRID and associate the stored TRID with the MID for the merchant. The TRID may be a number, or any other suitable identifier, specific to the merchant. In various embodiments, the TRID and associated MID may be referred to as a TRID and MID combination. In various embodiments, TSP server 140 may also may receive and store a consumer identifier and/or a transaction account associated with a consumer. The transaction account associated with the consumer and consumer identifier may comprise a primary account number (PAN). TSP server 140 may be configured to generate and store an account identifier associated with the PAN, consumer identifier, and/or transaction account, wherein the account identifier may be configured to identify, without disclosing the PAN, the transaction account associated with the consumer during a transaction. The account identifier may be a number or any other suitable identifier configured to identify the transaction account and/or the associated PAN of the consumer.

In various embodiments, as described herein, TSP server 140 may receive a token request from merchant server 130 comprising the merchant's MID and a consumer identifier associated with the consumer in the transaction. The token request may comprise requesting TSP server 140 to generate a digital token to serve as a virtual payment mechanism to complete the transaction. TSP server 140 may be configured to generate a digital token specific to the merchant and/or the transaction account of the consumer. In various embodiments, the TRID and the account identifier are separate identifiers. TSP server 140 may match the MID with the TRID assigned to the merchant, and/or TSP server 140 may match the consumer identifier with the account identifier associated with the transaction account of the consumer. In response to matching the MID with the TRID and/or matching the consumer identifier with the account identifier, TSP server 140 may generate a digital token comprising the TRID, serving to identify the merchant, and the account identifier, serving to identify the transaction account of the consumer. The digital token is unique to the specific merchant/transaction account combination. TSP server 140 may transmit the digital token to merchant server 130.

In various embodiments, TSP server 140 may receive and store an MID associated with a merchant and a consumer identifier associated with the consumer/transaction account from merchant server 130. In response, TSP server 140 may generate and store a transaction pair identifier specific to the merchant and/or the consumer, wherein a transaction pair identifier may be a number, or other suitable identifier, assigned to and/or associated with a specific combination of the consumer (and associated consumer identifier, account identifier, transaction account, etc.) and the merchant (and associated MID, TRID, etc.). TSP server 140 may associate the transaction pair identifier with the MID for the merchant and the consumer identifier for the consumer and transaction account. In various embodiments, the transaction pair identifier and associated MID may be referred to as a transaction pair identifier and MID combination. The transaction pair identifier may serve to identify the consumer/merchant combination, including the transaction account associated with the consumer. In various embodiments, the transaction pair identifier for a specific consumer/merchant combination may comprise the TRID associated with the merchant and the account identifier associated with the transaction account associated with the consumer, such that the transaction pair identifier may be a single identifier (i.e., a number) serving as both the TRID and the account identifier. In various embodiments, the TRID associated with a merchant and the account identifier associated with a consumer and the transaction account may be different identifiers (i.e., different numbers).

In various embodiments, as described herein, TSP server 140 may receive a token request from merchant server 130 comprising the merchant's MID and a consumer identifier associated with the consumer in the transaction. The token request may comprise requesting TSP server 140 to generate a digital token to serve as a virtual payment mechanism to complete the transaction. TSP server 140 may be configured to generate a digital token specific to the merchant and the transaction account of the consumer. In various embodiments, TSP server 140 may match the MID and/or the consumer identifier with a transaction pair identifier associated with, and/or assigned to, the merchant and the consumer. In response to matching the MID and/or the consumer identifier with a transaction pair identifier, TSP server 140 may generate a digital token comprising the transaction pair identifier that serves to identify both the merchant and the transaction account associated with the consumer. TSP server 140 may transmit the digital token to merchant server 130.

In various embodiments, issuer server 150 may be associated with a transaction account issuer, and may belong to any entity that issues transaction accounts to customers (i.e., consumers) such as credit cards, bank accounts, etc. Issuer server 150 may comprise hardware and/or software capable of storing data and/or analyzing information. Issuer server 150 may comprise a server appliance running a suitable server operating system (e.g., MICROSOFT INTERNET INFORMATION SERVICES or, "IIS") and having database software (e.g., ORACLE) installed thereon. Issuer server 150 may be in electronic communication with web client 120, merchant server 130, and/or TSP server 140. In various embodiments, issuer server 150 and TSP server 140 may be integral, that is, issuer server 150 may comprise TSP server 140. Stated another way, one server may serve as, and perform the operations of, issuer server 150 and TSP server 140. Issuer server 150 may store one or more transaction accounts, including transaction account information or indicia (i.e., information identifying each transaction account such as a PAN, account identifier, consumer identifier, etc.) associated with respective consumers. Issuer server 150 may also store MIDs and/or TRIDs, and/or TRID and MID combinations, associated with respective merchants and merchant servers 130. In various embodiments, issuer server 150 may store transaction pair identifiers, each identifying a specific merchant and transaction account of a consumer.

In various embodiments, issuer server 150 may be configured to receive an authorization request from merchant server 130 to complete a transaction. The authorization request may comprise a digital token and the MID for the merchant. The digital token in the authorization request may comprise a TRID for the merchant and an account identifier for the transaction account of the consumer. The TRID and MID in the authorization request may be a TRID and MID combination. In various embodiments, issuer server 150 may compare the TRID and MID combination in the digital token with TRID and MID combinations stored in issuer server 150. Issuer server 150 may compare the account identifier in the digital token with the account identifiers stored in issuer server 150. In response to the TRID and MID combination in the authorization request matching a TRID and MID combination stored in issuer server 150, and/or the account identifier in the digital token matching an account identifier stored in issuer server 150, issuer server 150 may send an authorization response to merchant server 130 approving the transaction. In response to the TRID and MID combination in the authorization request differing from the TRID and MID combinations stored in issuer server 150, and/or the account identifier in the digital token differing from the account identifiers stored in issuer server 150, issuer server 150 may send an authorization response to merchant server 130 rejecting the transaction.

In various embodiments, as discussed herein, the TRID and the account identifier may be comprised in a transaction pair identifier serving to identify the merchant and the transaction account for the consumer. Accordingly, the authorization request from merchant server 130 received by issuer server 150 may comprise the digital token comprising the transaction pair identifier, along with the MID. The transaction pair identifier and the MID in the authorization request may be a transaction pair identifier and MID combination. In various embodiments, issuer server 150 may compare the transaction pair identifier and MID combination in the authorization request with transaction pair identifier and MID combinations stored in issuer server 150. In response to the transaction pair identifier and MID combination in the authorization request matching a transaction pair identifier and MID combination stored in issuer server 150, issuer server 150 may send an authorization response to merchant server 130 approving the transaction. In response to the transaction pair identifier and MID combination in the authorization request differing from the transaction pair identifier and MID combinations stored in issuer server 150, issuer server 150 may send an authorization response to merchant server 130 rejecting the transaction.

In various embodiments, network 180 may be an open network or a closed loop network. The open network may be a network that is accessible by various third parties. In this regard, the open network may be the internet, a typical transaction network, and/or the like. Network 180 may also be a closed network. In this regard, network 180 may be a closed loop network like the network operated by American Express. Moreover, the closed loop network may be configured with enhanced security and monitoring capability.

For example, the closed network may be configured with tokenization, associated domain controls, and/or other enhanced security protocols. In this regard, network 180 may be configured to monitor users on network 180. In this regard, the closed loop network may be a secure network and may be an environment that can be monitored, having enhanced security features.

With respect to FIGS. 2A-6, the process flows depicted are merely embodiments of various embodiments, and are not intended to limit the scope of the disclosure. For example, the steps recited in any of the method or process descriptions may be executed in any order and are not limited to the order presented. It will be appreciated that the description herein makes appropriate references not only to the steps and consumer interface elements depicted in FIG. 2A-6, but also to the various system components as described above with reference to FIG. 1.

Figure 2A:
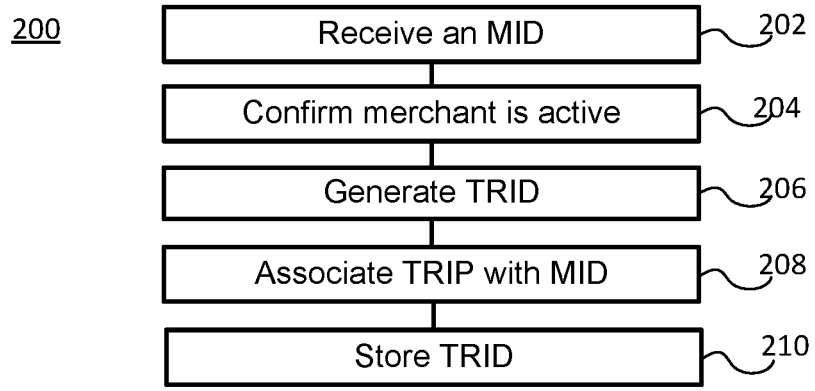
FIG. 2A depicts an exemplary method for generating a token requestor identifier (TRID) for a merchant, in accordance with various embodiments.

In accordance with various embodiments, FIG. 2A depicts a method 200 for assigning a TRID to a merchant. With combined reference to FIGS. 1 and 2A, a merchant may desired to be assigned a TRID from TSP server 140. Merchant server 130 may provide the MID. TSP server 140 may receive the MID (step 202). TSP server 140 may confirm that the merchant is an active merchant (step 204) by analyzing the merchant's recent transaction history. In various embodiments, TSP server 140 may compare the MID from the merchant to stored MIDs in TSP server 140 to discover if the merchant information is already stored in TSP server 140. In response to the merchant being an active merchant, TSP server 140 may generate a TRID (step 206) specific to the merchant. As discussed herein, TRID may be a number or any other suitable identifier specific to the merchant. In response to the merchant being inactive, no TRID may be generated for the merchant. TSP server 140 may associate the TRID with the MID (step 208) and store the TRID (step 210). The TRID may be associated with, and/or assigned to, the merchant. In various embodiments, the TRID and associated MID may be referred to as a TRID and MID combination.

Figure 2B:
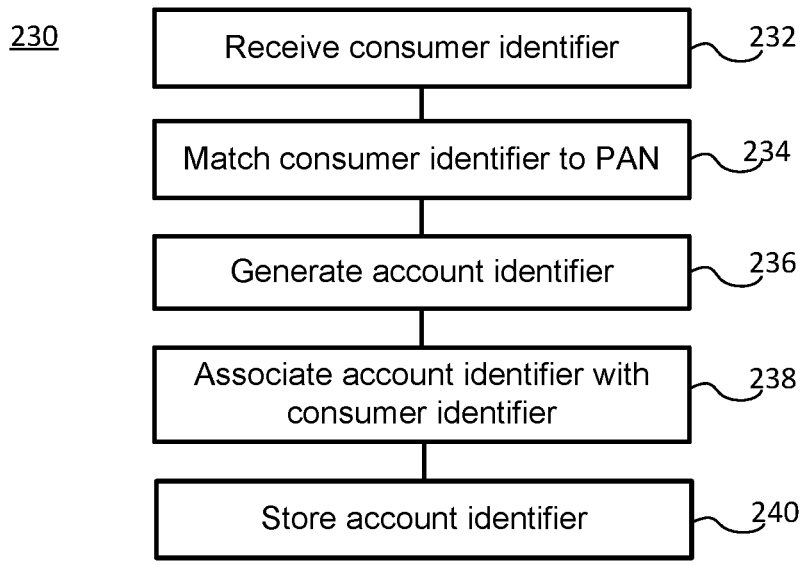
FIG. 2B depicts an exemplary method for generating an account identifier for a transaction account associated with a consumer, in accordance with various embodiments.

In accordance with various embodiments, FIG. 2B depicts a method 230 for generating an account identifier for a transaction account associated with the consumer. TSP server 140 may receive a consumer identifier (step 232) associated with a consumer profile, transaction account, PAN, and/or the like, each of which may be associated with one another. TSP server 140 may receive the consumer identifier from merchant server 130, through a submission by the consumer, or TSP server 140 and/or issuer server 150 may have generated the consumer identifier, or TSP server 140 may have received the consumer identifier from any other source. TSP server 140 may match the consumer identifier with a PAN (step 234), the consumer profile, transaction account, etc. In response, TSP server 140 may generate an account identifier (step 236) and associate the account identifier with the consumer identifier (step 238), consumer profile, transaction account, PAN, and/or the like. The account identifier may be assigned to the transaction account information associated with the consumer. TSP server 140 may store the account identifier (step 240). The account identifier may serve to identify the transaction account for the consumer in a transaction without disclosing the PAN to the merchant.

Figure 2C:
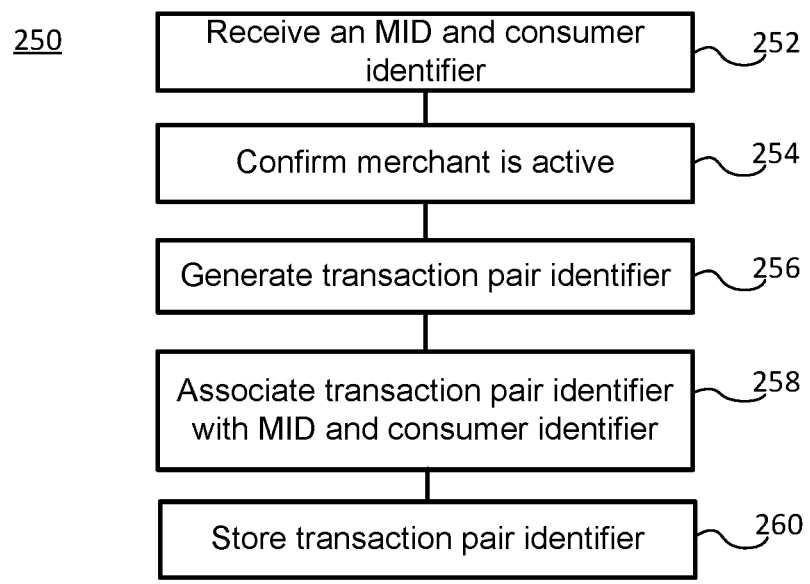
FIG. 2C depicts an exemplary method for generating a transaction pair identifier for a specific merchant/transaction account combination, in accordance with various embodiments.

In accordance with various embodiments, FIG. 2C depicts a method 250 for generating a transaction pair identifier for a specific merchant/transaction account combination. Merchant server 130 may provide the MID and/or the consumer identifier. TSP server 140 may receive the MID and the consumer identifier (step 252). TSP server 140 may match the consumer identifier with an account identifier that was generated and associated with the consumer identifier. The consumer identifier and/or account identifier may be associated with the transaction account and/or PAN. TSP server 140 may confirm that the merchant is an active merchant (step 254) by analyzing the merchant's recent transaction history. In response to the merchant being an active merchant, TSP server 140 may generate a transaction pair identifier (step 256) specific to the merchant/transaction account combination. The transaction pair identifier may serve to identify the merchant and the transaction account of the consumer in a transaction. As discussed herein, transaction pair identifier may be a number or any other suitable identifier specific to the combination of the merchant/transaction account of the consumer. In response to the merchant being inactive, no transaction pair identifier may be generated for the merchant/transaction account combination. TSP server 140 may associate the transaction pair identifier with the MID and the consumer identifier (step 258) and store the transaction pair identifier (step 260). In various embodiments, the transaction pair identifier and associated MID may be referred to as a transaction pair identifier and MID combination.

Figure 3A:
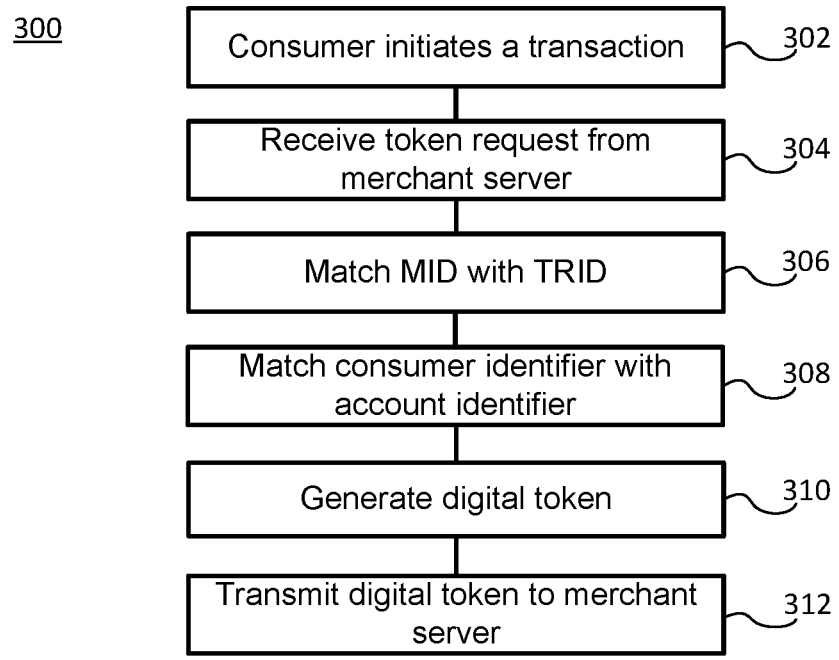
FIGS. 3A and 3B depict exemplary methods for generating a digital token, in accordance with various embodiments.
Figure 3B:
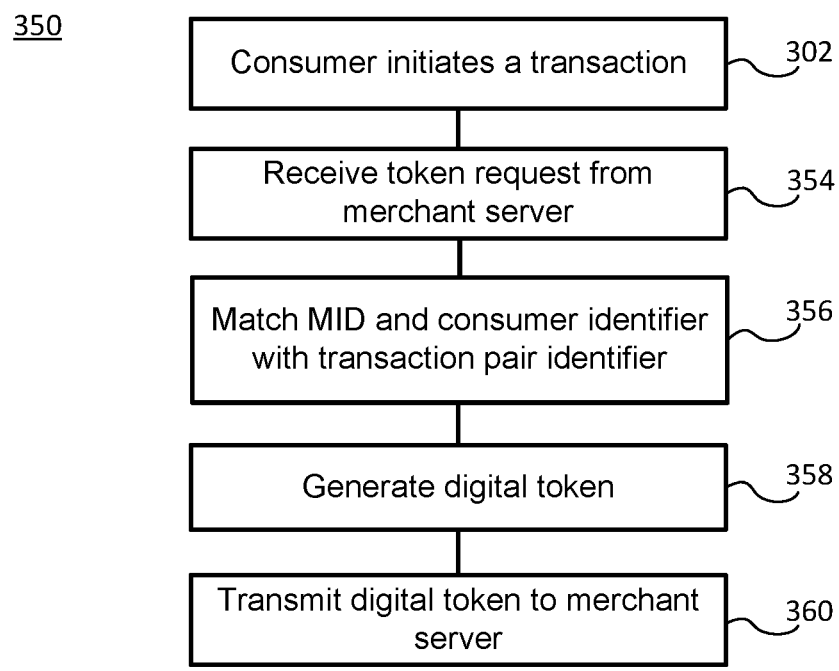

In accordance with various embodiments, FIGS. 3A and 3B depict methods 300 and 350, respectively, for generating a digital token. With combined reference to FIGS. 1, 3A, and 3B, a consumer may initiate a transaction (step 302) through web client 120. In various embodiments, the consumer may be accessing the online store 132 of merchant server 130 to conduct the transaction, or in various embodiments, the consumer may be conducting a transaction at a point-of-sale terminal at the merchant's physical location. In various embodiments, the consumer may be authenticated by the consumer logging into a consumer profile, and conducting the transaction through the consumer profile. The consumer may provide merchant server 130 with a consumer identifier as part of initiating the transaction. In various embodiments, the merchant server 130 may request a digital token from TSP server 140 in response to the consumer initiating a transaction. TSP server 140 may receive the token request from merchant server 130 (step 304). The token request from merchant server 130 may comprise the MID associated with the merchant and the consumer identifier associated with the consumer.

In various embodiments, with reference to FIGS. 1 and 3A, TSP server 140 may match the MID associated with the merchant with a TRID (step 306) associated with the MID stored in TSP server 140 (the TRID being generated through method 200, depicted in FIG. 2A, for example). TSP server 140 may match the consumer identifier associated with the consumer with an account identifier (step 308) associated with the consumer identifier and the transaction account of the consumer (the account identifier being generated through method 230, depicted in FIG. 2B, for example). In response, TSP server 140 may generate a digital token (step 310) comprising the TRID and the account identifier, which is specific to the merchant associated with the TRID. TSP server 140 may transmit the digital token to the merchant server (step 312).

In various embodiments, with reference to FIGS. 1 and 3B, TSP server 140 may match the MID from the merchant and the consumer identifier from the consumer with a transaction pair identifier (step 356) stored in TSP server 140 (the transaction pair identifier being generated through method 250, depicted in FIG. 2C, for example). The transaction pair identifier may identify the merchant and the transaction account for the consumer. TSP server 140 may generate a digital token (step 358) comprising the transaction pair identifier, which is specific to the merchant associated with the transaction pair identifier. In various embodiments, as discussed herein, the transaction pair identifier may serve as a single identifier both the TRID for the merchant and account identifier for the transaction account of the consumer. TSP server 140 may transmit the digital token to merchant server 130 (step 360).

Figure 4A:
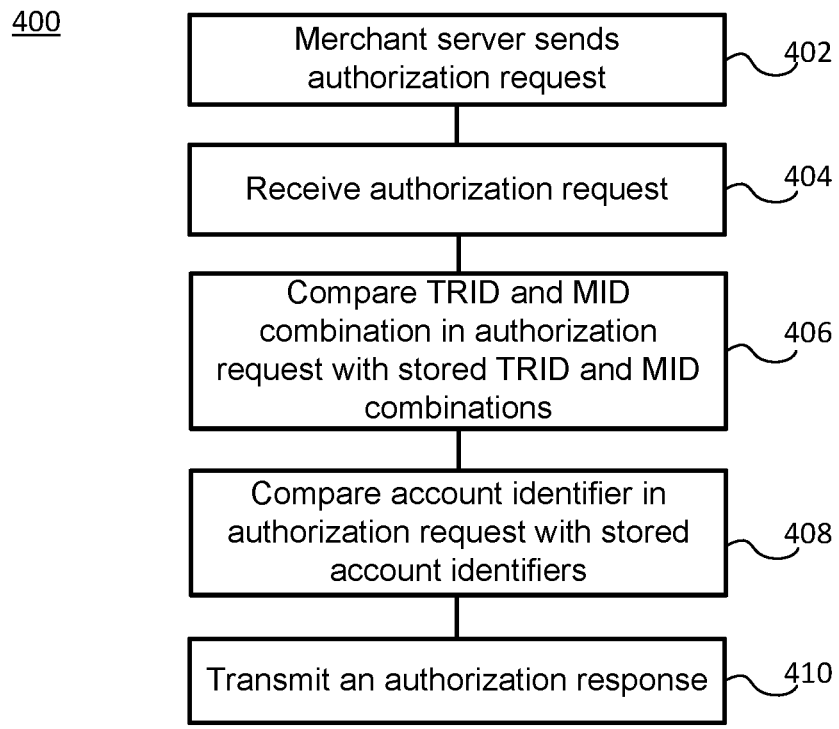
FIGS. 4A and 4B depict exemplary methods for authorizing a transaction, in accordance with various embodiments.
Figure 4B:
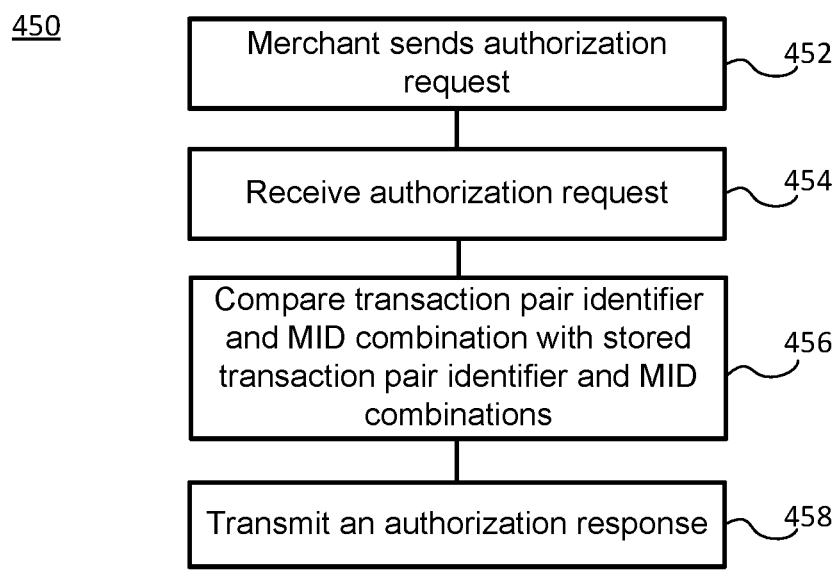

In accordance with various embodiments, FIGS. 4A and 4B depict methods 400 and 450, respectively, for authorizing a transaction. Referring to FIGS. 1 and 4A, in various embodiments, merchant server 130 may send an authorization request (step 402) to issuer server 150. The authorization request may comprise the digital token generated in method 300 (depicted in FIG. 3A) and the MID, wherein the digital token comprises the TRID associated with the MID and the account identifier associated with the transaction account of the consumer. The TRID and the MID in the authorization request may be a TRID and MID combination. Issuer server 150 may receive the authorization request (step 404). In response to receiving the authorization request (step 404), issuer server 150 may compare the TRID and MID combination in the authorization request to stored TRID and MID combinations (step 406) in issuer server 150. Issuer server 150 may compare the account identifier in the authorization request to stored account identifiers (step 408) in issuer server 150. In response to comparing the TRID the MID combinations, and/or the account identifiers, issuer server 150 may transmit an authorization response (step 410) to merchant server 130. In response to the TRID and MID combination in the authorization request matching a stored TRID and MID combination in issuer server 150, and/or the account identifier in the authorization request matching a stored account identifier in issuer server 150, the authorization response may approve the transaction. In response to the TRID and MID combination in the authorization request differing from the stored TRID and MID combinations in issuer server 150, and/or the account identifier in the authorization request differing from the stored account identifier in issuer server 150, the authorization response may reject the transaction. Issuer server 150 may also reject the transaction in response to the transaction account being inactive, cancelled, delinquent, and/or the like.

Referring to FIGS. 1 and 4B, in various embodiments, merchant server 130 may send an authorization request (step 452) to issuer server 150. The authorization request may comprise the digital token generated in method 350 (depicted in FIG. 3B) and the MID, wherein the digital token comprises the transaction pair identifier that is associated with the MID of the merchant and consumer identifier (which is associated with the transaction account of the consumer). The transaction pair identifier and the MID in the authorization request may be a transaction pair identifier and MID combination. Issuer server 150 may receive the authorization request (step 454). In response to receiving the authorization request (step 454), issuer server 150 may compare the transaction pair identifier and MID combination in the authorization request to stored transaction pair identifier and MID combinations (step 456) in issuer server 150. In response to comparing the transaction pair identifier and MID combinations, issuer server 150 may transmit an authorization response (step 458) to merchant server 130. In response to the transaction pair identifier and MID combination in the authorization request matching a stored transaction pair identifier and MID combination in issuer server 150, the authorization response may approve the transaction. In response to the transaction pair identifier and MID combination in the authorization request differing from the stored transaction pair identifier and MID combinations in issuer server 150, the authorization response may reject the transaction. Issuer server 150 may also reject the transaction in response to the transaction account being inactive, cancelled, delinquent, and/or the like.

Figure 5A:
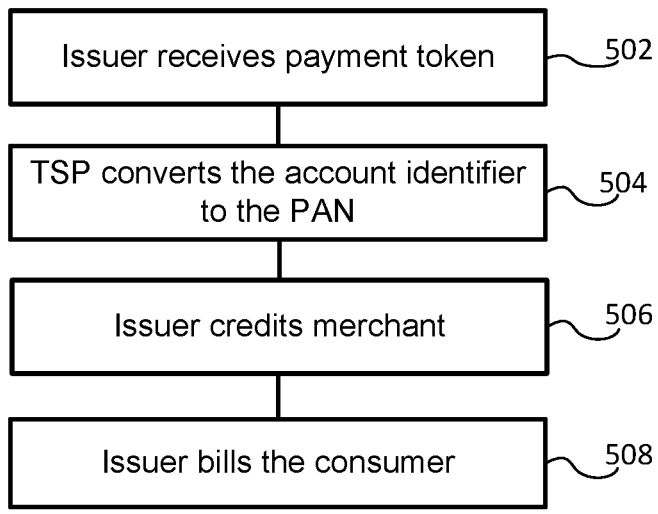
FIGS. 5A and 5B depict exemplary methods for completing a transaction, in accordance with various embodiments.
Figure 5B:
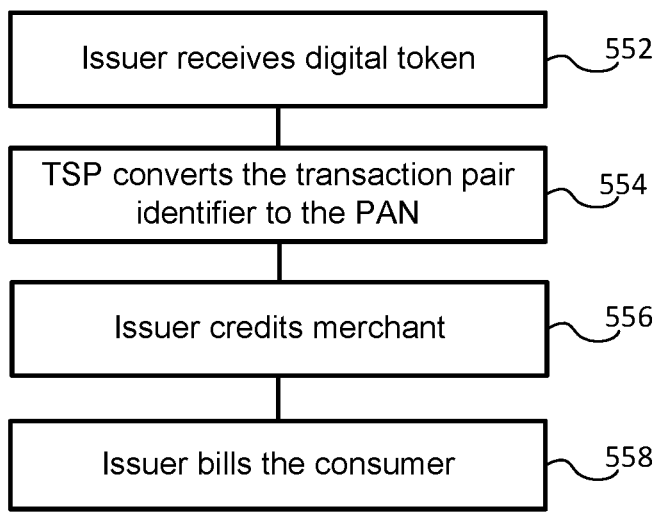

In accordance with various embodiments, FIGS. 5A and 5B depict methods 500 and 550, respectively, for completing a transaction. Referring to FIGS. 1 and 5A, in various embodiments, issuer server 150 may receive the digital token (step 502) from merchant server 130 in response to the transaction being approved by issuer server 150. As discussed herein, TSP server 140 may be in communication with issuer server 150, and TSP server 140 may convert the account identifier in the digital token to the PAN (step 504) to identify the transaction account of the consumer. Issuer server 150 may receive the PAN, and in response, may credit the merchant (step 506) for the amount of currency for the transaction. In response, issuer server 150 may bill the consumer (step 508) for the amount of the transaction.

Referring to FIGS. 1 and 5B, in various embodiments, issuer server 150 may receive the digital token (step 552) from merchant server 130 in response to the transaction being approved by issuer server 150. As discussed herein, TSP server 140 may be in communication with issuer server 150, and TSP server 140 may convert the transaction pair identifier in the digital token to the PAN (step 554) to identify the transaction account of the consumer. Issuer server 150 may receive the PAN, and in response, may credit the merchant (step 556) for the amount of currency for the transaction. In response, issuer server 150 may bill the consumer (step 558) for the amount of the transaction.

Figure 6:
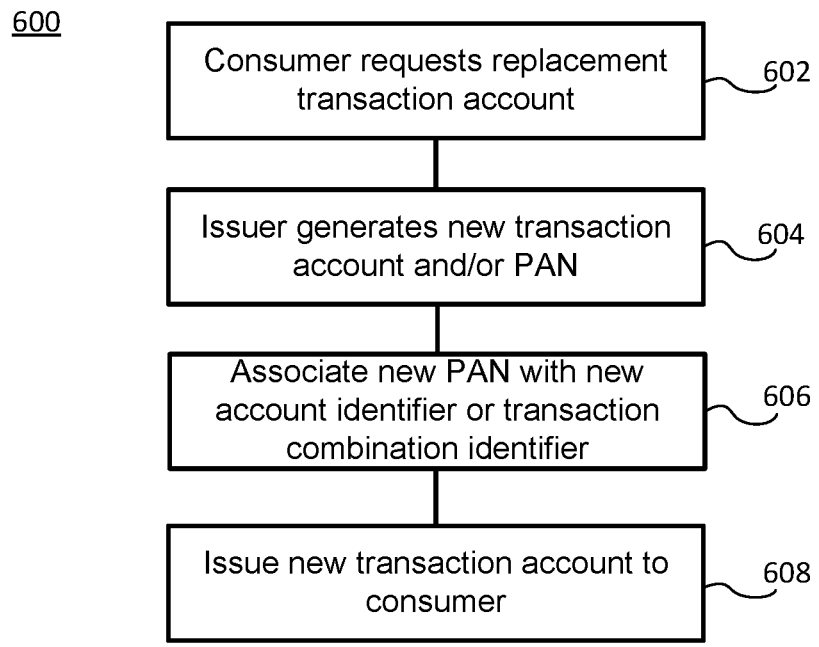
FIG. 6 depicts an exemplary method for replacing a transaction account, in accordance with various embodiments.

FIG. 6 depicts a method for replacing a transaction account, in accordance with various embodiments. A consumer may request a replacement transaction account (step 602) for any reason including a previous transaction account being compromised, misplacing a transaction instrument associated with the previous transaction account, etc. Issuer server 150 may generate a new transaction account and/or new PAN (step 604) for the consumer. In various embodiments, issuer server 150, in communication with TSP server 140, may associate the new PAN with the account identifier (step 606), or in various embodiments, issuer server 150 may associate the new PAN with the transaction pair identifier (step 606). Through the communication between issuer server 150 and TSP server 140, both issuer server 150 and TSP server 140 may be updated with the new PAN and associated information. Finally, issuer server 150 may issue a new transaction account to the consumer (step 608).

Creating a TRID or a transaction pair identifier that is specific to a certain merchant and MID, and including the TRID or transaction pair identifier in a digital token may help to prevent fraud. For example, without a merchant-specific TRID or transaction pair identifier, if a merchant experiences a data breach by a hacker, and the merchant's customers' data is compromised, the hacker may be able to use the transaction account information for the consumers in the digital tokens held by the merchant to conduct fraudulent transactions with other merchants. If a merchant has a merchant-specific TRID or transaction pair identifier in every digital token, however, which is associated with the merchant MID, a hacker would not be able to use the digital tokens, or the information comprised within the digital tokens, at any other merchant because the TRID (or transaction pair identifier) in the tokens would not match another merchant's MID. That is, if an issuer server 150 receives an authorization request with a TRID (or transaction pair identifier) that is not associated with the correct MID (i.e., an incorrect TRID (or transaction pair identifier) and MID combination because the authorization request is sent from a fraudulent source, issuer server 150 will reject the transaction. Therefore, if a merchant experiences a data breach, the merchant may simply invalidate its digital tokens for its consumers without affecting the consumers' ability to transact with other merchants. The other merchants have their own distinct TRIDs or transaction pair identifiers in their digital tokens with the consumers' transaction account information, which have not been compromised by the data breach of another merchant.

Furthermore, assigning TRIDs or transaction pair identifiers to merchants does not necessarily change the requirements for how merchants conduct and/or process transactions. Merchants do not have to add anything to their token request or authorization request. The TRID or transaction pair identifier and additional analysis or work required for transaction authorization/completion, or transaction account replacement, is provided and completed by TSP server 140 and/or issuer server 150. Therefore, the merchant-specific digital tokens generated by the methods and systems in this disclosure add fraud protection without adding burden to merchants.

As discussed herein, in various embodiments, the operations performed by TSP server 140 may be performed by issuer server 150, or vice versa, wherein TSP server 140 and issuer server 150 are integral. Additionally, a digital token created to identify a specific combination of a merchant and a transaction account of a consumer may be valid for that merchant/transaction account combination once, or any desired number or times, or for any desired duration.

The various components in system 100 may be independently, separately or collectively suitably coupled to each other, and/or network 180, via data links which include, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

In various embodiments, the system and method may include alerting a subscriber (e.g., a user, consumer, etc.) when their web client 120 (e.g., computer) is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface (i.e., comprised in web client 120) for dynamically relocating/rescaling obscured textual information of an underlying window to become automatically viewable to the user. Such textual information may be comprised in merchant online store 132 and/or any other interface presented to the consumer or user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen (comprised in web client 120, for example); displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email, messages within online store 132) to prevent a computer, server, and/or system from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over consumers during affiliate purchase transactions, using a system for co-marketing the "look and feel" of the host web page (e.g., online store 132) with the product-related content information of the advertising merchant's web page. The system can be operated by a third-party outsource provider, who acts as a broker between multiple hosts and advertising merchants. Prior to implementation, a host places links to an advertising merchant's server on the host's web page (e.g., online store 132). The links are associated with product-related content on the advertising merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A consumer who clicks on an advertising link is not transported from the host web page to the advertising merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the consumer as associated with the host web page. The server then transmits and presents this composite web page to the consumer so that she effectively remains on the host web page to purchase the item without being redirected to the third party advertising merchant affiliate. Because such composite pages are visually perceived by the consumer as associated with the host web page, they give the consumer the impression that she is viewing pages served by the host. Further, the consumer is able to purchase the item without being redirected to the third party advertising merchant affiliate, thus allowing the host to retain control over the consumer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of advertising merchants; and wherein the selected advertising merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an account identifier. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, which buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like). A "consumer profile" or "consumer profile data" may also comprise transaction account information or indicia associated with the consumer.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

Practitioners will appreciate that web client 120 may or may not be in direct contact with an application server. For example, web client 120 may access the services of an application server through another server and/or hardware component, which may have a direct or indirect connection to an Internet server. For example, web client 120 may communicate with an application server via a load balancer. In various embodiments, access is through a network or the Internet through a commercially-available web-browser software package.

As those skilled in the art will appreciate, web client 120 may include an operating system (e.g., WINDOWS®/CE/Mobile, OS2, UNIX®, LINUX®, SOLARIS®, MacOS, etc.) as well as various conventional support software and drivers typically associated with computers. Web client 120 may include any suitable personal computer, network computer, workstation, personal digital assistant, cellular phone, smart phone, minicomputer, mainframe or the like. Web client 120 can be in a home or business environment with access to a network. In various embodiments, access is through a network or the Internet through a commercially available web-browser software package. Web client 120 may implement security protocols such as Secure Sockets Layer (SSL) and Transport Layer Security (TLS). Web client 120 may implement several application layer protocols including http, https, ftp, and sftp.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java® 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction account in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of web client 120 may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a My SQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The systems and methods may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "user", "consumer", "customer", "cardmember", "business" or "merchant" may be used interchangeably with each other, and each shall mean any person, entity, government organization, business, machine, hardware, and/or software. A bank (e.g., the issuer) may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The user has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to a "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code", "consumer account", "consumer credential", or "consumer identifier" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction account may have electronic and communications functionality enabled, for example, by: a network of electronic circuitry that is printed or otherwise incorporated onto or within the transaction account (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number, i.e., a PAN, may be, for example, a sixteen-digit account number, although each credit provider has its own numbering system, such as the fifteen-digit numbering system used by American Express. An account identifier may also be in the form of an account number. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, a consumer identifier, a PAN, an account identifier, and the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "financial transaction account," "transaction account" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the user, consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor", or an entity that processes payments or generates digital tokens for payments, may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
    receiving, by a computer based system associated with a token service provider, a token request for a transaction, the token request being received from a merchant server, the token request comprising a consumer identifier associated with a consumer and a merchant identifier (MID) associated with the merchant server, and the token service provider being different from the merchant server;
    matching, by the computer based system, the MID with a token requestor identifier (TRID), wherein the TRID and MID are specific to the merchant server;
    matching, by the computer based system, the consumer identifier with an account identifier associated with a transaction account of the consumer;
    generating, by the computer based system, a digital token comprising the TRID and the account identifier, wherein the digital token is specific to the merchant server associated with the TRID and the transaction account of the consumer, and the digital token being generated by the token service provider to serve as a virtual payment mechanism to complete the transaction;
    transmitting, by the computer based system, the digital token to the merchant server;
    receiving, by the computer based system, the digital token from the merchant server, in response to the transaction being approved; and
    converting, by the computer based system, the account identifier in the digital token to a primary account number (PAN) to identify the transaction account of the consumer.

2. The method of claim 1, further comprising generating, by the computer based system, a transaction pair identifier comprised of the TRID and the account identifier, wherein the transaction pair identifier is associated for the transaction with the merchant server and with the transaction account of the consumer, and wherein the generating the digital token further comprises generating the digital token with the transaction pair identifier specific to the merchant server associated with the transaction pair identifier.

3. The method of claim 2, wherein the matching the MID with the TRID comprises matching the MID with the transaction pair identifier, and wherein the matching the consumer identifier with the account identifier comprises matching the consumer identifier with the transaction pair identifier.

4. The method of claim 3, further comprising:
receiving, by the computer based system and from the merchant server, the MID and a request to be assigned the TRID;
confirming, by the computer based system, that a merchant associated with the merchant server is an active merchant based on recent transaction history of the merchant;
determining, by the computer based system, that the MID received from the merchant server matches a stored MID;
generating, by the computer based system, the TRID for the merchant server prior to the
receiving the token request; and
associating, by the computer based system, the TRID to the MID in response to the assigning the TRID.

5. The method of claim 4, further comprising receiving, by the computer based system, an authorization request comprising the digital token and the MID, the digital token comprising the TRID and the account identifier, wherein the TRID and the MID are a TRID and MID combination.

6. The method of claim 5, further comprising comparing, by the computer based system, the TRID and MID combination in the authorization request to a stored TRID and MID combination.

7. The method of claim 6, further comprising transmitting, by the computer based system, an authorization response to the merchant server, wherein the authorization response at least one of rejects the transaction in response to the MID and MID combination differing from the stored TRID and MID combination, or approves the transaction in response to the TRID and MID combination matching the stored TRID and MID combination.

8. The method of claim 7, further comprising:
generating, by the computer based system, the account identifier from the consumer identifier, in response to receiving the consumer identifier from the merchant server; and
associating, by the computer based system, the account identifier with the consumer identifier, transaction account information and the PAN.

9. The method of claim 1, further comprising receiving, by the computer based system, an authorization request comprising the digital token and the MID, wherein the digital token comprises a transaction pair identifier associated with the MID and the consumer identifier, wherein the transaction pair identifier is comprised of the TRID and the account identifier, wherein the transaction pair identifier is associated for the transaction with the merchant server and with the transaction account of the consumer, and wherein the generating the digital token further comprises generating the digital token with the transaction pair identifier specific to the merchant server associated with the transaction pair identifier.

10. An article of manufacture including a non-transitory, tangible computer readable memory having instructions stored thereon that, in response to execution by a computer based system, cause the computer based system to perform operations comprising:
receiving, by the computer based system associated with a token service provider, a token request for a transaction, the token request being received from a merchant server, the token request comprising a consumer identifier associated with a consumer and a merchant identifier (MID) associated with the merchant server, and the token service provider being different from the merchant server;
matching, by the computer based system, the MID with a token requestor identifier (TRID), wherein the TRID and MID are specific to the merchant server;
matching, by the computer based system, the consumer identifier with an account identifier associated with a transaction account of the consumer;
generating, by the computer based system, a digital token comprising the TRID and the account identifier, wherein the digital token is specific to the merchant server associated with the TRID and the transaction account of the consumer, and the digital token being generated by the token service provider to serve as a virtual payment mechanism to complete the transaction;
transmitting, by the computer based system, the digital token to the merchant server;
receiving, by the computer based system, the digital token from the merchant server, in response to the transaction being approved; and
converting, by the computer based system, the account identifier in the digital token to a primary account number (PAN) to identify the transaction account of the consumer.

11. The article of claim 10, further comprising:
receiving, by the computer based system and from the merchant server, the MID and a request to be assigned the TRID;
confirming, by the computer based system, that a merchant associated with the merchant server is an active merchant based on recent transaction history of the merchant;
determining, by the computer based system, that the MID received from the merchant server matches a stored MID;
generating, by the computer based system, the TRID for the merchant server prior to the receiving the token request; and
associating, by the computer based system, the TRID to the MID in response to the assigning the TRID.

12. The article of claim 10, further comprising receiving, by the computer based system, an authorization request comprising the digital token and the MID, the digital token comprising the TRID and the account identifier, wherein the TRID and the MID are a TRID and MID combination.

13. The article of claim 12, further comprising comparing, by the computer based system, the TRID and MID combination in the authorization request to a stored TRID and MID combination.

14. The article of claim 13, further comprising transmitting, by the computer based system, an authorization response to the merchant server, wherein the authorization response at least one of rejects the transaction in response to the TRID and MID combination differing from the stored TRID and MID combination, or approves the transaction in response to the TRID and MID combination matching the stored TRID and MID combination.

15. A computer based system comprising:

a processor; and a tangible, non-transitory memory configured to communicate with the processor, the tangible, non-transitory memory having instructions stored thereon that, in response to execution by the processor, cause the processor to perform operations comprising:

receiving, by the computer based system associated with a token service provider, a token request for a transaction from a merchant server, the token request comprising a consumer identifier associated with a consumer and a merchant identifier (MID) associated with the merchant server, and the token service provider being different from the merchant server;

matching, by the computer based system, the MID with a token requestor identifier (TRID) assigned, wherein the TRID and MID are specific to the merchant server;

matching, by the computer based system, the consumer identifier with an account identifier associated with a transaction account of the consumer;

generating, by the computer based system, a digital token comprising the TRID and the account identifier, wherein the digital token is specific to the merchant server associated with the TRID and the transaction account of the consumer, and the digital token being generated by the token service provider to serve as a virtual payment mechanism to complete the transaction;

transmitting, by the computer based system, the digital token to the merchant server;

receiving, by the computer based system, the digital token from the merchant server, in response to the transaction being approved; and converting, by the computer based system, the account identifier in the digital token to a primary account number (PAN) to identify the transaction account of the consumer.

16. The computer based system of claim 15, further comprising generating, by the computer based system, a transaction pair identifier comprised of the TRID and the account identifier, wherein the transaction pair identifier is associated for the transaction with the merchant server and with the transaction account of the consumer, and wherein the generating the digital token further comprises generating the digital token with the transaction pair identifier specific to the merchant server associated with the transaction pair identifier.

17. The computer based system of claim 16, wherein the matching the MID with the TRID comprises matching the MID with the transaction pair identifier, and wherein the matching the consumer identifier with the account identifier comprises matching the consumer identifier with the transaction pair identifier.

18. The computer based system of claim 15, further comprising:

receiving, by the computer based system and from the merchant server, the MID and a request to be assigned the TRID;

confirming, by the computer based system, that a merchant associated with the merchant server is an active merchant based on recent transaction history of the merchant;

determining, by the computer based system, that the MID received from the merchant server matches a stored MID;

generating, by the computer based system, the TRID for the merchant server prior to the receiving the token request; and associating, by the computer based system, the TRID to the MID in response to the assigning the TRID.

19. The computer based system of claim 15, further comprising receiving, by the computer based system, an authorization request comprising the digital token and the MID, the digital token comprising the TRID and the account identifier, wherein the TRID and the MID are a TRID and MID combination.

20. The computer based system of claim 19, further comprising comparing, by the computer based system, the TRID and MID combination in the authorization request to a stored TRID and MID combination.

* * * * *